Figure 1:
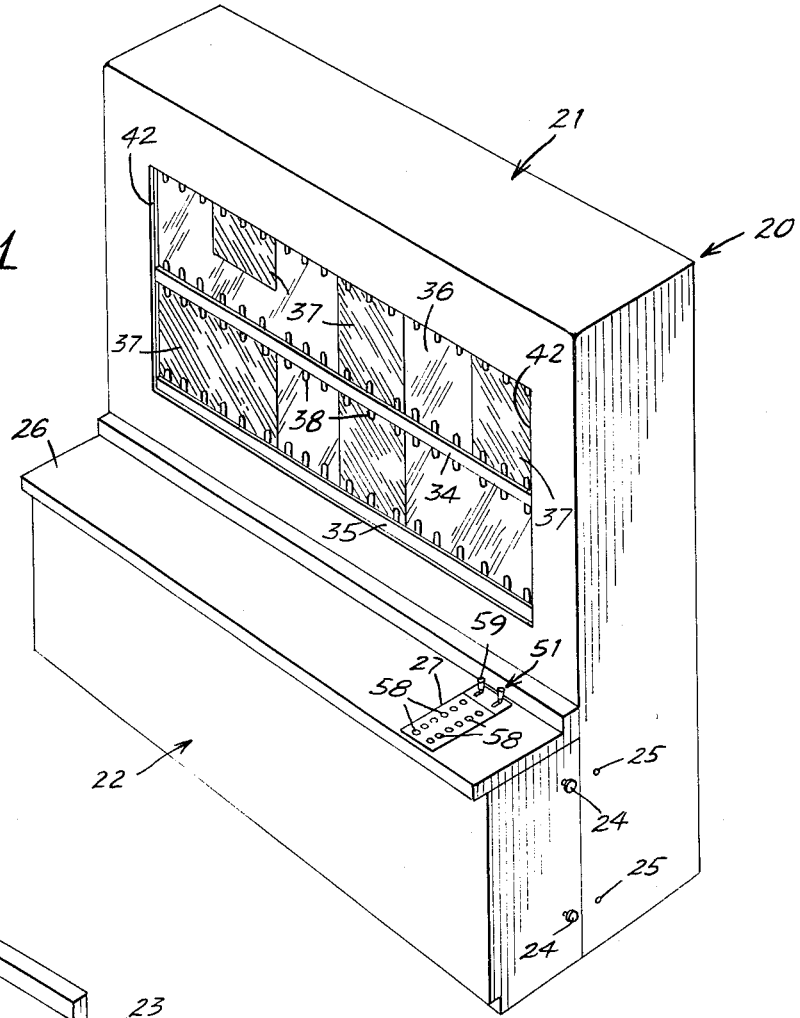

Aug. 24, 1965  S. L. SCHLEISNER-MEYER  3,201,883
X-RAY VIEWER

Filed Nov. 24, 1961  6 Sheets-Sheet 1

INVENTOR
*Steen Leopold Schleisner-Meyer*

BY Felix A. Russell
ATTORNEY

Aug. 24, 1965    S. L. SCHLEISNER-MEYER    3,201,883
X-RAY VIEWER
Filed Nov. 24, 1961    6 Sheets-Sheet 2

INVENTOR
*Steen Leopold Schleisner-Meyer*

BY *Felix A. Russell*

ATTORNEY

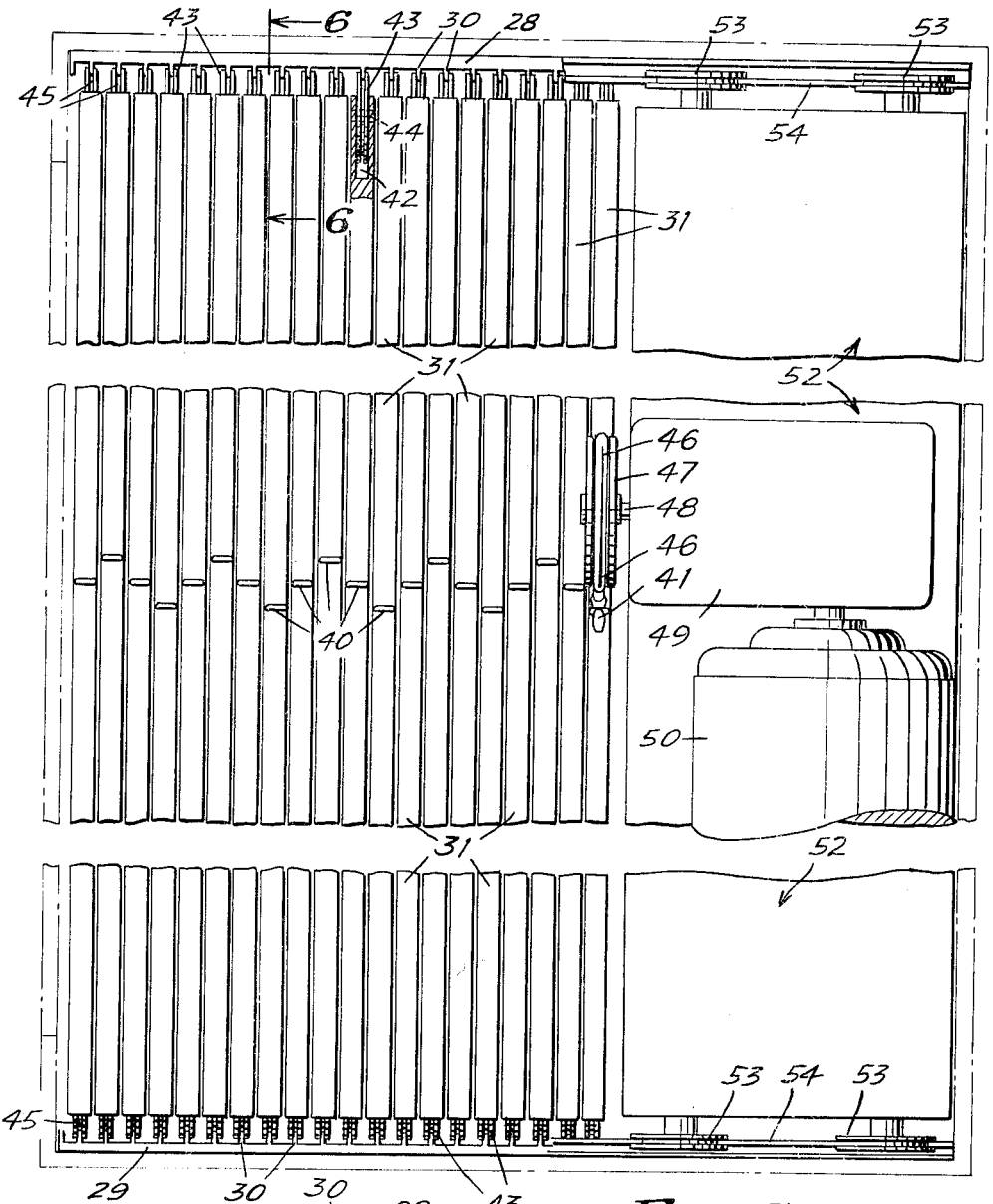
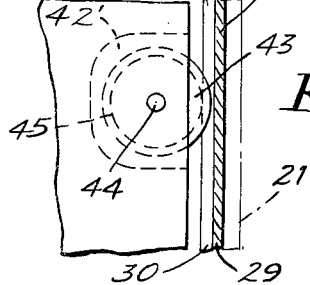
Fig. 5
Fig. 6

Aug. 24, 1965   S. L. SCHLEISNER-MEYER   3,201,883
X-RAY VIEWER

Filed Nov. 24, 1961   6 Sheets-Sheet 4

INVENTOR
*Steen Leopold Schleisner-Meyer*

BY *Felix A. Russell*

ATTORNEY

Aug. 24, 1965  S. L. SCHLEISNER-MEYER  3,201,883
X-RAY VIEWER
Filed Nov. 24, 1961  6 Sheets-Sheet 5
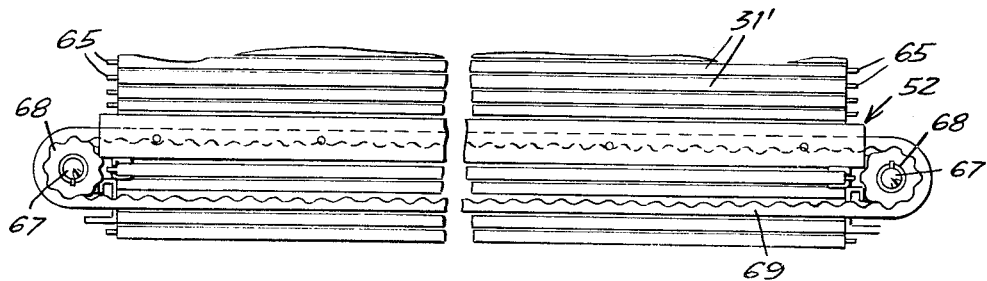
Fig. 10
Fig. 11
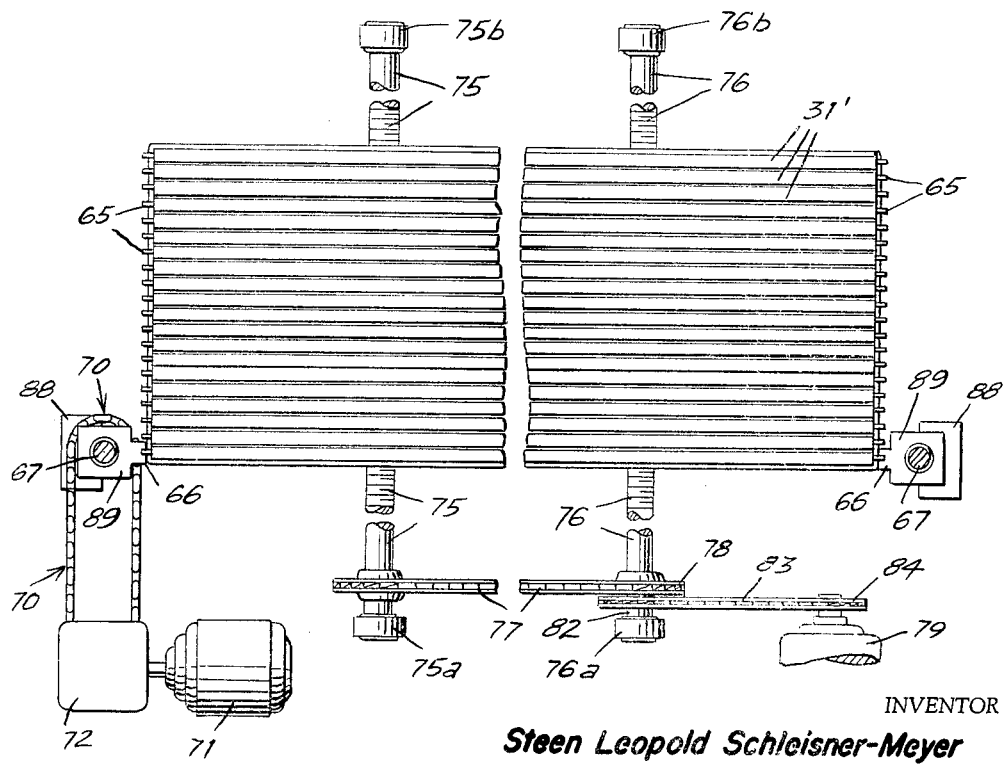
INVENTOR
Steen Leopold Schleisner-Meyer
BY *Felix A. Russell*
ATTORNEY

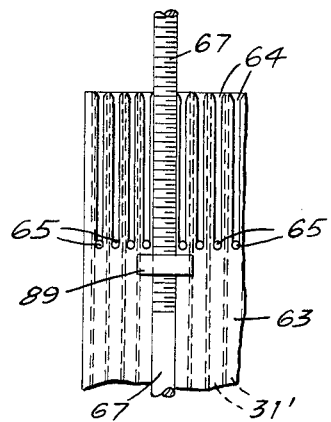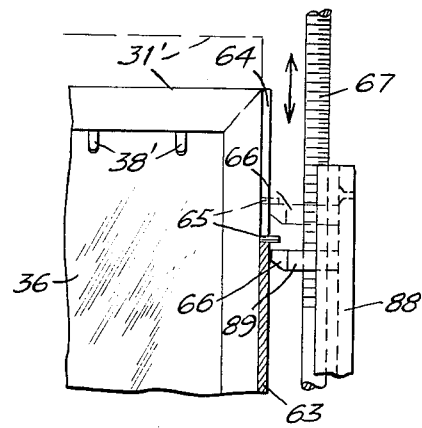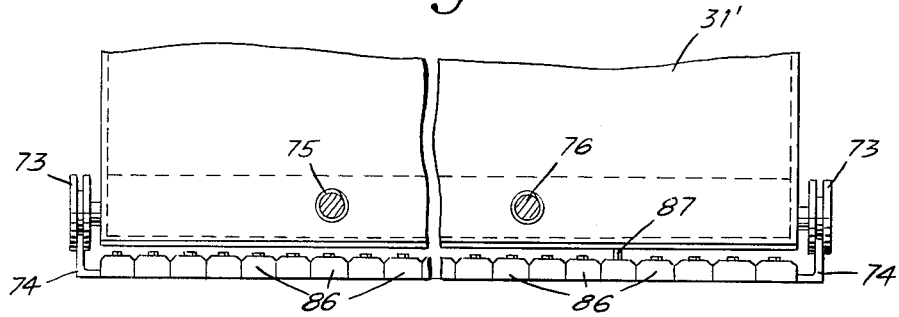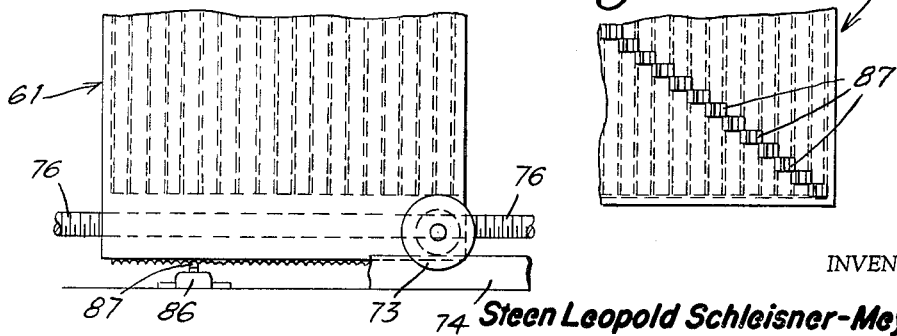

United States Patent Office    3,201,883
Patented Aug. 24, 1965

3,201,883
X-RAY VIEWER
Steen Leopold Schleisner-Meyer, Mount Wilson, Md.
(Rome State School, Box 550, Rome, N.Y.)
Filed Nov. 24, 1961, Ser. No. 154,558
2 Claims. (Cl. 40—106.1)

This invention relates to an X-ray viewer and it consists in the combinations, constructions and arrangements of parts hereinafter described and claimed.

Generally there is provided a cabinet structure having the general size and shape of an upright piano. A large viewing window is cut in the front wall of the upper portion of the cabinet structure. The lower portion of the cabinet structure houses a magazine holding a large number of vertically disposed and separately movable frames, each of which is glazed with panels of transparent plastic material and has conventional clips for mounting X-ray films against said panels. The frames are selectively movable up from the magazine by a reversible electrically driven mechanism so as to be positioned in the viewing window. Behind the viewing window are located a plurality of separately energizable lamps, each being provided with a reflector of a size to illuminate a standard 17 inch by 14 inch X-ray film. Each frame can hold 12 films disposed in two horizontally extending rows.

It is accordingly an object of the present invention to provide an X-ray viewer in which a large number of films may be stored and be quickly and easily moved to viewing position from a magazine housed within the viewer, so as to save the radiologist or physician valuable time heretofore wasted in looking for film in stacks or filing cabinets and putting films into and removing the same from envelopes, etc.

It is another object of the invention to provide an X-ray viewer having a desk-like ledge or shelf in front of and below the viewing window to support papers, writing pads, etc., for study or the taking of notes while the films are being viewed.

It is a further object of the invention to provide a device of the character described in which the various frames can be quickly and easily selected by the operation of push buttons for automatic movement to a position for raising thereof into viewing position in the viewer window.

It is another object of the invention to provide an X-ray viewer having a magazine holding a plurality of frames easily and quickly movable to and from a viewing position in front of a bank of separately energizable illuminating devices in which each frame is large enough for mounting thereon two horizontally disposed rows of up to six films each for simultaneous viewing and comparison of an old set of films with a new set to determine the patient's progress.

It is a further object of the invention to provide a device of the character described comprising two separable cabinet sections which may readily be disconnected to facilitate shipping, moving the sections through average sized doorways and other handling.

It is yet another object of the invention to provide novel means for interconnecting in operable condition the aforesaid separable sections.

Figure 7:
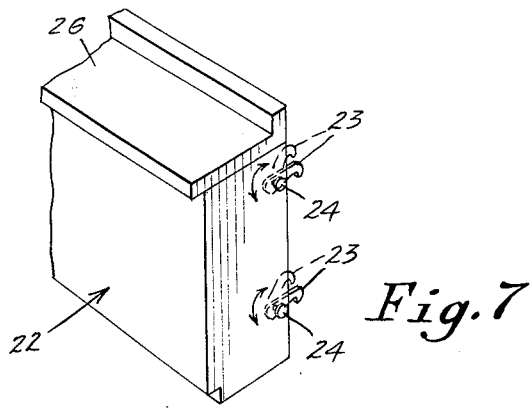
Figure 4:
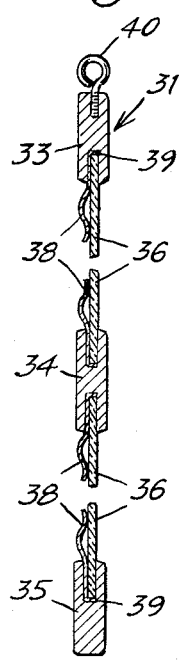
Figure 2:
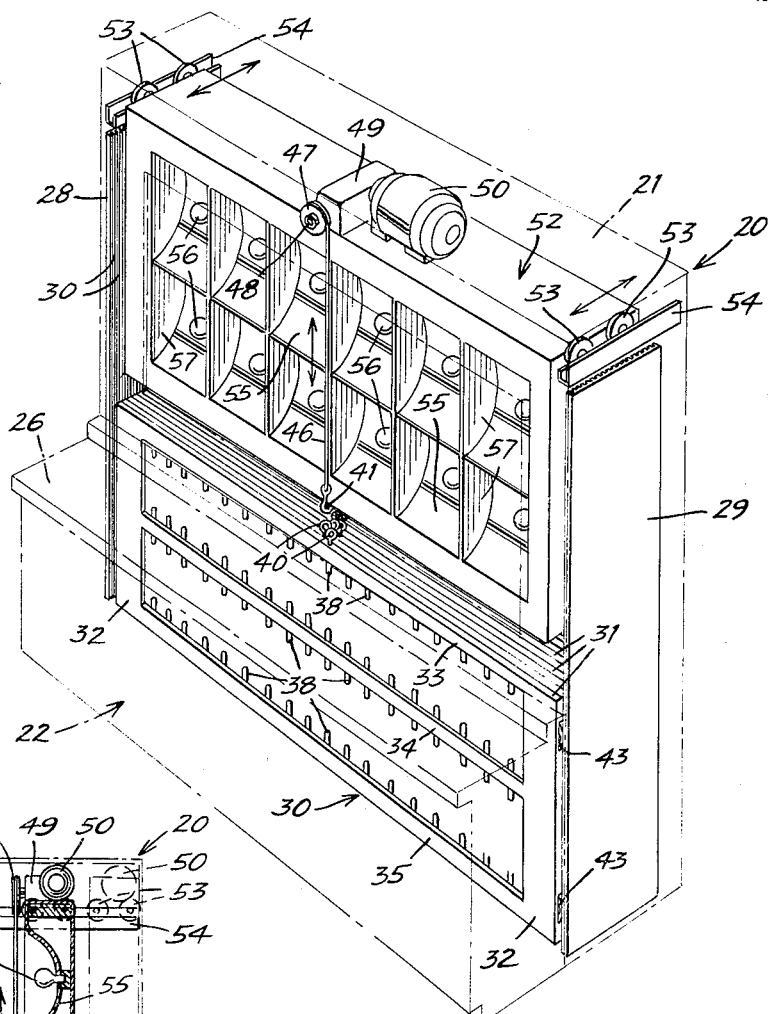
Figure 3:
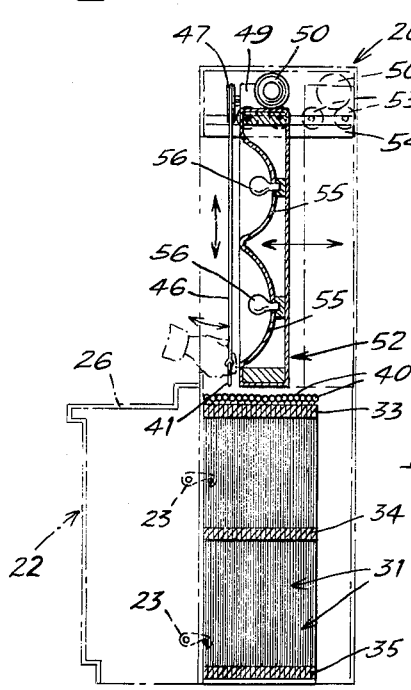
Figure 8:
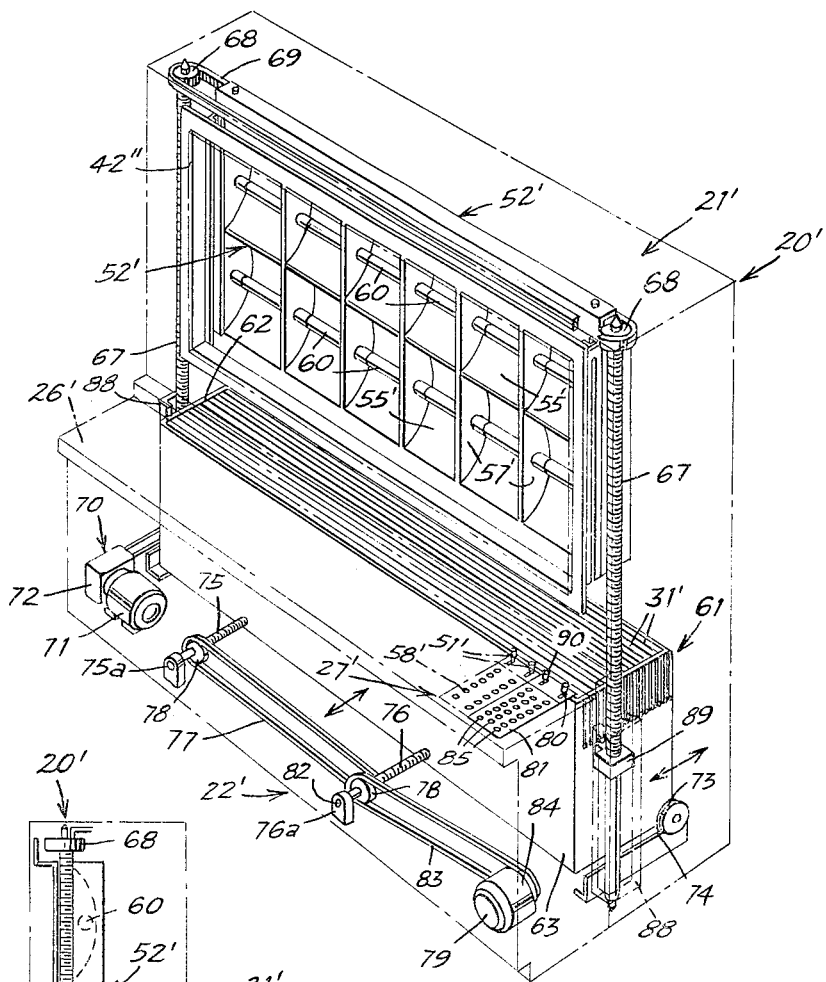
Figure 9:
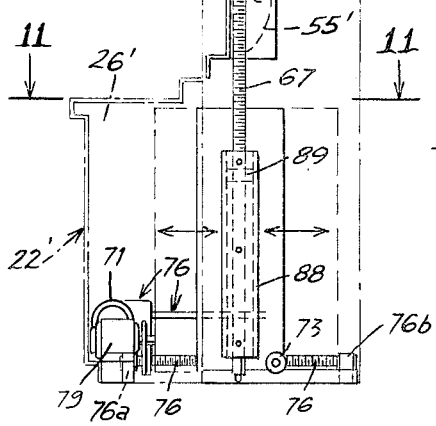

Other and further objects of the invention will become apparent from a reading of the following specification taken in conjunction with the drawings, in which:

FIGURE 1 is a perspective view of a preferred embodiment of the invention,

FIGURE 2 is a perspective view of the device of FIGURE 1, showing internal mechanism of the viewer, FIGURE 3 is a side elevational view of the disclosure of FIGURE 2 from the right end thereof, FIGURE 4 is an enlarged end elevational view in vertical medial section of one of the film holding movable frames, FIGURE 5 is an enlarged plan view of the showing of FIGURE 3, FIGURE 6 is a further enlarged fragmentary elevational view in section taken on line 6—6 of FIGURE 5, FIGURE 7 is a fragmentary perspective view showing the quickly operable coupling means for connecting the front and rear cabinet sections, FIGURE 8 is a perspective view of a more highly mechanized species of the invention, FIGURE 9 is an end elevational view of the disclosure of FIGURE 8, FIGURE 10 is an enlarged fragmentary plan view of the central structure of the showing of FIGURE 9, FIGURE 11 is an enlarged plan view in section taken on line 11—11 of FIGURE 9, FIGURE 12 is an enlarged fragmentary end elevational view of the frame lifting mechanism, FIGURE 13 is a fragmentary front elevational view of the showing of FIGURE 12, FIGURE 14 is a fragmentary front elevational view of the frame selecting bank of control switches, FIGURE 15 is a side elevational view of the disclosure of FIGURE 14, and FIGURE 16 is a fragmentary bottom plan view showing the stepped arrangement of control fingers forming a part of the invention.

With reference now to FIGURES 1 to 7 of the drawings, the numeral 20 generally designates the X-ray viewer as a whole. The viewer 20 is housed within a two-piece cabinet structure comprising a relatively tall rear cabinet section 21 and a removable front cabinet section 22 of table or desk height. The cabinet sections 21 and 22 are quickly detachably interconnected by four hooks 23 operated by externally accessible knobs 24 and engageable over internally extending latch pins 25, in known manner. The cabinet section 22 has a panel 26 forming a desk or work surface and serving as a mounting means for a control panel 27 (hereinafter more fully described).

Attached to the inner surfaces of the end walls of the cabinet section 21 is a pair of vertically disposed parallel guide plates 28 and 29, the opposed faces of which are provided with a plurality of parallel guide ribs 30 which cooperate with grooved wheels or rollers 43 on film supporting frames 31, next to be described.

Each of the twenty or more film supporting frames 31 (shown in detail in FIG. 4) is formed of rigid plastic material or lightweight alloy and comprises a pair of relatively wide end elements 32 rigidly interconnected by three equally spaced horizontally disposed frame elements 33, 34 and 35. The opposed edges of the frame elements 32—35 are centrally grooved to receive the edges of clear plastic (or glass) panels 36, against which films 37 (FIG. 1) are quickly and easily detachably clipped by a plurality of spring fingers 38 of generally conventional construction. The bases of the clips 38 are flanged at 39 so that the clips 38 are held firmly in the opposed grooves in the frame elements 32—35 by the edges of the panels 36. An eye screw 40 is fixed to the upper central portion of each frame element 33 for selective engagement by a hook 41 by which each frame 31 can be raised up into a viewing window 42 by mechanism hereinafter more fully described.

Each end of frame element 32 is provided with an upper and a lower outwardly open recess 42' (FIGS. 5 and 6) into each of which is fixed the guide wheel 43 rotatably mounted on a fixed pin 44. Each wheel 43 is peripherally grooved at 45 to guidingly straddle the guide ribs 30 of the guide plates 28 and 29 described above.

The hook 41 by which the viewing frames 31 are selectively raised and lowered by engagement of said hook 41 with one of the staggered eye screws 40, is raised and lowered by a cord or cable 46 which is wound upon or unwound from a pulley-shaped spool 47. The spool 47 is fixedly mounted on a shaft 48 of a reduction gear box 49. The gear box 49 is driven by an electric motor 50. The electric motor 50 is energized from a conventional power supply and is controlled by a conventional double-throw switch 51 (FIG. 1), the operating lever of which has the usual three positions in which the middle position is the deenergized position which the two extreme positions operate the motor to raise the selected frame or reverse the motor to lower said frame, respectively.

The gear box 49 and the motor 50 are mounted on the upper surface of a rectangular frame 52 which is mounted for fore and aft manual movement in the upper portion of the cabinet section 21 by four rollers 53 riding in the channels of two channel bars 54 fixed to the end wall of the cabinet section 21 adjacent its top wall. The rectangular frame 52 has a pair of horizontally disposed trough-shaped parabolic reflectors 55 mounted therein and facing forwardly so as to project light from a plurality of lamps 56 positioned adjacent the foci of the reflectors 55 and spaced therealong to correspond to midportions of the areas of films to be clipped to the viewing panels 36 by the clips 38. Each reflector 55 is further provided with divider panels 57 also spaced to correspond to the positions of the side margins of the films to be elliminated by the reflector cells defined by said partitions 57. It should be noted that circular and/or tubular lamp bulbs could be used in addition to the lamps 56 or be substituted therefor. Each lamp 56 is provided with a push-button switch 58 mounted on the control panel 27 (FIG. 1). A three-position control lever 59 is desirably employed for a master control for turning on all of the lamps 56 in one position or in another position thereof for turning off all of the lamps that may have been separately energized by the push-buttons 58.

In order to view one or more films mounted on one of the plurality of frames 31 constituting a magazine of films, the operator moves the frame 52 rearwardly or forwardly on its supporting tracks 54 to a position which brings the hook 41 over the selected one of the eye screws 40 corresponding to the selected frame 31. The hook 41 is then engaged with the eye screw of the selected frame and the motor control switch 51 is moved from its central "off" position to an extreme position corresponding to the frame raising operation of the motor 50, the control lever being held in such position until a frame is raised to desired position for examination of the films mounted thereon. It should be noted that conventional automatic electric controls can be built into the apparatus to prevent damaging energization of the motor 50 after the selected frame has been raised to its position for viewing, or a protective slip clutch can be built into the gear box 49 if preferred. Selected ones of the push-button switches 58 are then energized to illuminate the films to be studied. If needed to locate the desired films, the master control switch 59 could be operated to turn on all of the lights 56 temporarily, and then be returned to its extreme position to extinguish all of the lights preparatory to energizing only those behind the films to be studied at a given viewing. When the study is completed the master control switch 59 is operated to extinguish all of the lamps 56, and finally the control lever 51 is operated to lower the frame back into its storage position in the magazine.

In the modification of the invention illustrated in FIGURES 8 through 16, parts which are substantially identical with those of the first described species are designated by primed numerals which, unprimed, were used to indicate their counterparts in the species of FIGURES 1 through 8. In the modified showing of FIGURES 8 through 16 a film illuminating reflector unit generally designated 52' is fixedly mounted immediately behind a window 42" in a rear cabinet section 21'. Lamps 60 in this species are shown as being tubular and as being mounted with their filaments (not shown) located closely adjacent the focal lines of the two sets of parabolic reflectors formed by trough-shaped members 55' and dividing partitions 57'.

A magazine, generally designated 61, in which film mounting frames 31' are vertically movably mounted, comprises a pair of end walls 62 and 63 slotted at their upper ends to provide vertical guides 64 in which the frame supporting and guiding pins 65 ride. The pins 65 are selectively engaged, depending upon the fore and aft position of the magazine 61, by a pair of frame-lifting fingers 66 synchronously raised and lowered by a pair of threaded shafts 67. The shafts 67 are synchronously interconnected by a pair of sprocket-like pulleys 68 fixed to their upper ends and by an interconnecting toothed belt or chain 69 engaged around the pulleys 68. One of the threaded shafts 67 is driven by conventional mechanism generally designated 70 and including a motor 71 and a reduction gear box 72. The motor 71 is reversibly controlled by a double-throw switch 51' mounted on a control panel 27', which panel also mounts push-button switches 58' for selectively controlling energization of various ones of the lamps 60.

The magazine 61 is partially supported and guided for fore and aft movements by a pair of peripherally grooved rollers 73 which ride on the upper edge of the vertical flange of an angle bar track 74 fixed to the floor panel of the cabinet section 21' adjacent each end thereof.

The fore and aft movement of the magazine 61 is affected and controlled by a pair of threaded shafts 75 and 76 the ends of which are fixed in thrust bearings 75a and 75b and 76a and 76b and which are driven in synchronism by a toothed belt or sprocket chain 77 engaged over and around a pair of sprockets 78 fixed to the near ends of the shafts 75 and 76. The shaft 76 and thereby the shaft 75 are driven by a reversible electric motor 79 controlled by a double-throw switch 80 mounted on a control panel 81. The motor 79 is coupled to the shaft 76 by a pulley 82, a belt 83 and a pulley 84.

A plurality of push-button switches 85 on the control panel 81 selectively close the circuits to a series of switches 86 which are positioned, as shown in FIGURE 14, in a row extending across the bottom of the magazine 61. Each of the switches 86 is positioned to be engageable by a depending finger 87 on one of the frames 31' so as to arrest movement of the magazine 61 when the switch 86 is operated by its control finger 87, the fingers extending stepwise, as shown in FIGURE 16. The fingers 66 are guided and held against rotation on the rotating shafts 67 by a pair of channel bar guides fixed to the end wall of the cabinet section 21' and embracing a squared nut 89 to which the fingers 66 are fixed.

To view X-ray films with the apparatus of FIGURES 8 through 16, the operator first turns a master control switch 90 to its "on" position. Next, one of the push-button switches 85, corresponding to the frame carrying the films to be studied, is pushed to set one of the selector switches 86 for being automatically operated by the pin 87 on the bottom edge of the selected frame 31'. The lever 80 is then moved to its "on" position and is held in said position until the magazine 61 has moved to bring the selected pin 87 into stopping engagement with the switch 86 connected into the circuit by operation of the selecting button 85. Next, the switch 51' is moved to its frame raising position and is held in said position until the frame selected has been raised to viewing position. The desired light or lights are then turned on by pushing the buttons 58' corresponding to the films to be illuminated.

While but two forms of the invention have been shown and described herein, it will be readily apparent to those skilled in the art that many minor modifications may be made without departing from the spirit of the invention or the scope of the appended claims.

What is claimed is:

1. An X-ray film viewer of the character described comprising; a cabinet, a plurality of similar rectangular frames having means by which a plurality of X-ray films are adapted to be removably secured in each of said frames, a window in the upper section of the front wall of said cabinet, a plurality of reflectors mounted in fixed position in the upper section of said cabinet behind said window, a light source mounted in each of said reflectors at the focal point thereof, means by which said light sources are adapted to be selectively energized, a magazine having a bottom wall and a pair of longitudinally spaced vertically disposed parallel end walls between which said frames are slidably mounted in spaced parallel relation for up and down movement, means by which said magazine is mounted in the lower section of said cabinet below said reflectors for back and forth movement therein, said end walls being each provided with a plurality of vertically disposed transversely spaced parallel slots which extend downwardly from the upper ends thereof, each of said frames being provided with a pair of longitudinally aligned pins, which extend outwardly from the ends thereof through said slots whereby said frames are guided in the up and down movement thereof, power means by which said magazine is adapted to be moved to bring a selected frame into and out of position to be moved upwardly from said magazine into viewing position between said window and said reflectors; said power means comprising a pair of spaced parallel horizontally disposed screws which are rotatably mounted in fixed position in said cabinet and operatively connected to said magazine, and a first reversible motor by which said screws are adapted to be rotated in unison, and frame elevating means by which a selected frame is adapted to be raised up from said magazine into viewing position between said window and said reflectors and returned to said magazine, said frame elevating means comprising; a pair of longitudinally spaced vertically disposed parallel screws which are rotatably mounted in fixed position in said cabinet one adjacent each end wall of said magazine, a second reversible motor by which said vertically disposed screws are adapted to be rotated in unison, an internally threaded nut mounted on each of said vertically disposed screws which are raised and lowered by the rotation of said vertically disposed screws, guide means by which said nuts are constrained against rotation on said screws during rotation thereof, a finger carried by each of said nuts in position to engage the said pins carried by a selected frame which has been moved into alignment with said vertically disposed screws and thereby raise said selected frame up from said magazine into viewing position when said vertically disposed screws are rotated in one direction and lower said selected frame back into said magazine when said vertically disposed screws are rotated in the opposite direction, means by which the actuation of said second reversible motor is selectively controlled; a first switching means by which said first reversible motor is energized in accordance with a selected frame to move said magazine forwardly from normal at rest position, a second switching means which is adapted to be actuated by said selected frame to deenergize said first reversible motor when said selected frame has been moved into alignment with said vertically disposed screws, and a third switching means by which said first reversible motor is energized to return said magazine to normal at rest position.

2. An X-ray film viewer as defined by claim 1 in which said second switching means comprises a plurality of normally closed switches one of which is associated with each of the said frames mounted in said magazine, and in which a pin is mounted on each of said frames in position to engage the said associated switch to move it from normal closed position to open position.

References Cited by the Examiner

UNITED STATES PATENTS

| | | | |
|---|---|---|---|
| 857,630 | 6/07 | Keeler | 40—67 |
| 977,080 | 11/10 | Duncan | 312—199 X |
| 1,219,693 | 3/17 | Bentley | 129—16.1 |
| 1,500,867 | 7/24 | Glover | 40—106.1 |
| 1,903,008 | 3/33 | Michlik et al. | 40—130 |
| 2,079,024 | 5/37 | McCauley | 40—63 |
| 2,321,229 | 6/43 | Miller | 129—16.1 |
| 2,384,355 | 9/45 | Torrence | 40—53 |
| 2,386,520 | 10/45 | Watson | 129—16.1 |
| 2,534,851 | 12/50 | Branzell | 40—79 |
| 2,646,636 | 7/53 | Gandee | 40—106.1 X |
| 2,807,109 | 9/57 | Rockhill et al. | 40—65 |
| 2,821,037 | 1/58 | Westphal | 40—106.1 |
| 2,915,195 | 12/59 | Crosby | 312—199 X |

FOREIGN PATENTS

| | | |
|---|---|---|
| 3,012 | 1909 | Great Britain. |
| 457,650 | 3/15 | France. |
| 1,142,655 | 4/57 | France. |

ROBERT E. PULFREY, *Primary Examiner.*

L. J. LENNY, JEROME SCHNALL, *Examiners.*